United States Patent
Frey et al.

(10) Patent No.: US 12,272,256 B2
(45) Date of Patent: Apr. 8, 2025

(54) SYSTEM AND A METHOD FOR GENERATING A WEATHER MAP

(71) Applicant: Sony Group Corporation, Tokyo (JP)

(72) Inventors: Matthias Frey, Stuttgart (DE); Peter Dürr, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 299 days.

(21) Appl. No.: 17/799,271

(22) PCT Filed: Feb. 18, 2021

(86) PCT No.: PCT/EP2021/054042
§ 371 (c)(1),
(2) Date: Aug. 12, 2022

(87) PCT Pub. No.: WO2021/165407
PCT Pub. Date: Aug. 26, 2021

(65) Prior Publication Data
US 2023/0069833 A1    Mar. 9, 2023

(30) Foreign Application Priority Data
Feb. 19, 2020  (EP) .................................... 20158168

(51) Int. Cl.
*G08G 5/00* (2006.01)
*G01W 1/10* (2006.01)
*B64U 101/35* (2023.01)

(52) U.S. Cl.
CPC ............ *G08G 5/0091* (2013.01); *G01W 1/10* (2013.01); *G08G 5/003* (2013.01); *B64U 2101/35* (2023.01)

(58) Field of Classification Search
CPC .. G08G 5/0091; G08G 5/003; B64U 2101/35; G01W 1/10; G01W 1/02; G01W 1/08; Y02A 90/10
See application file for complete search history.

(56) References Cited

U.S. PATENT DOCUMENTS

2010/0019938 A1*  1/2010  Bunch ....................... G01S 7/04
                                                                         340/963
2015/0379408 A1   12/2015  Kapoor et al.
(Continued)

OTHER PUBLICATIONS

International Search Report and Written Opinion mailed on May 19, 2021, received for PCT Application PCT/EP2021/054042, filed on Feb. 18, 2021, 10 pages.
(Continued)

*Primary Examiner* — Yufeng Zhang
(74) *Attorney, Agent, or Firm* — XSENSUS LLP

(57) ABSTRACT

The present disclosure relates to a system for generating a weather map. The system comprises a mobile device configured to move to first locations within an environment and obtain first weather data indicative of a weather condition at the first locations by using a sensor. Further, the system comprises a data processing circuitry configured to generate a weather map including a probability distribution of weather conditions between the first locations by applying a predetermined weather model to the first weather data. The data processing circuitry is further configured to determine second locations through a threshold comparison of the probability distribution. The mobile device is further configured to move to the second locations and obtain second weather data indicative of a weather condition at the second locations, by using the sensor, for increasing a confidence of the weather map using the second weather data.

20 Claims, 6 Drawing Sheets

(56) References Cited

U.S. PATENT DOCUMENTS

| | | |
|---|---|---|
| 2018/0141563 A1 | 5/2018 | Becker |
| 2018/0247542 A1 | 8/2018 | Koduru et al. |
| 2018/0321379 A1 | 11/2018 | Foltan et al. |
| 2020/0241571 A1* | 7/2020 | Torii .................. B64C 13/20 |

OTHER PUBLICATIONS

Dietrich, "Are Drones the Answer to More Accurate Weather Forecasts?", Emerging Tech, Available Online at: https://www.govtech.com/products/are-drones-the-answer-to-more-accurate-weatherforecasts.html, XP055802426, Apr. 5, 2019, 8 pages.

* cited by examiner

SYSTEM AND A METHOD FOR GENERATING A WEATHER MAP

CROSS-REFERENCE TO RELATED APPLICATIONS

The present application is based on PCT filing PCT/EP2021/054042, filed Feb. 18, 2021, which claims priority to EP 20158168.3, filed Feb. 19, 2020, the entire contents of each are incorporated herein by reference.

FIELD

Embodiments of the present disclosure relate to a system and a method for generating a weather map. The embodiments particularly relate to a concept for generating the weather map using an aerial vehicle.

BACKGROUND

Weather maps can play an important role in scientific and commercial sectors. For example, weather maps can be used to observe weather phenomena or for navigation purposes in aviation.

A generation of two-dimensional (2D) or three-dimensional (3D) weather maps may involve measurements at a number of locations. The larger the number of locations, the more time consuming and expensive the generation of the weather maps may be.

Document US 2018/024 754 2 A1 describes a method for gathering and distributing critical weather event information. The method includes monitoring for critical weather events based on defined critical weather event thresholds with an onboard producer weather detection unit of a producer vehicle to produce predicted weather data within a geo-spatial grid. Those weather event thresholds are reconfigured at least partly based on consumption needs of a consumer vehicle anticipated to travel within the geo-spatial grid.

Document US 2018/032 137 9 A1 describes a method implementing a probabilistic weather severity estimation. The method includes gathering meteorological information from a plurality of vehicles within a space volume. For future weather severity estimation, the method comprises calculating a probabilistic weather severity based on the meteorological information and an assigning of computed probabilistic weather severity values to nodes in a matrix which are associated with a part of a volume in the space volume.

Document US 2018/014 156 3 A1 describes a method for operating a vehicle. The method provides for a detection of weather conditions and controlling an operation of one or more vehicles based on the weather conditions.

None of the aforementioned documents discloses a concept for reducing a number of measurements for generating a weather map.

Hence, there may be a demand of an improved concept for generating a weather map.

SUMMARY

This demand may be satisfied by the subject-matter of the appended independent and dependent claims.

According to a first aspect, the present disclosure relates to a system for generating a weather map. The system comprises at least one mobile device which comprises at least one sensor. The mobile device is configured to move to predetermined first locations within an environment and obtain first weather data indicative of a weather condition at each of the first locations by using the sensor.

Further, the system comprises a data processing circuitry configured to generate a weather map including a probability distribution of weather conditions between the first locations by applying a predetermined weather model to the first weather data. The data processing circuitry is further configured to determine, from the weather map, one or more second locations within the environment where the probability distribution is below a predefined threshold.

The mobile device is further configured to move to the second locations and obtain second weather data indicative of a weather condition at each of the second locations, by using the sensor, for increasing a confidence of the weather map using the second weather data.

The sensor, for example, is a thermometer, a wind sensor or a humidity sensor. Alternatively the sensor can be a sensor for sensing pollen or fine particles with a diameter of 2.5 μm or less, a so-called "PM2.5 sensor".

Accordingly, the first and the second weather data can be indicative of parameters, such as a temperature, a wind direction, a wind velocity, a humidity and/or a concentration of pollen or fine particles. Those parameters, for example, are characteristic for weather conditions which can be understood as states of the Earth's atmosphere. The weather conditions, for example, comprise wind, storm, pollination, rainfall, snowfall, sunshine, fog and/or hail.

In some embodiments, the system can comprise multiple and/or combinations of the aforementioned sensors.

In context of the present disclosure, the mobile device can be understood as a vehicle or an aerial vehicle. The mobile device, for example, is a helicopter or an unmanned aerial vehicle (UAV).

The first locations can be indicative of two-dimensional coordinates (e.g. geographical coordinates) or three-dimensional coordinates, for example including geographical coordinates and a height. Thus, in context of the present disclosure, the environment can be understood as an area or a space on or above ground.

The data processing circuitry can be a processor, a computer, a micro-controller, a field-programmable array, a graphics processing unit (GPU), a central processing unit (CPU) or any programmable hardware.

The predetermined weather model for generating the weather map, can be an experimentally determined numerical model for estimating the probabilities of weather conditions between the first locations using the first weather data as input. The weather model, for example, interpolates the weather conditions between the first locations based on the first weather data.

The probabilities of the weather conditions, for example, are indicative of a confidence of an estimation of the weather map at different locations between the first locations.

The probability distribution can be understood as a (spatial) mapping of the probabilities of the weather conditions onto the environment.

The data processing circuitry can compare the probability distribution to a predefined threshold which, for example, depends on a desired minimum level of confidence of the weather map, to determine the second locations where the probability distribution falls short of the threshold and can communicate the second locations to the mobile device.

Subsequently, the mobile device can move to the second locations to gather the second weather data and can communicate the second weather data to the data processing circuitry.

This, for example, enables the data processing circuitry to update the weather map using the second weather data. Thus, the probabilities at the second locations can exceed the predefined threshold. In this way, the system can provide a weather map having the desired minimum level of confidence without additional redundant measurements. Thus, the number of measurements can be reduced vis-à-vis established concepts for generating weather maps.

According to a second aspect, the present disclosure relates to a method for generating a weather map. The method comprises moving a sensor to predetermined first locations of an environment and obtaining first weather data indicative of a weather condition at each of the first locations using the sensor. Further, the method provides for generating a weather map including a probability distribution of weather conditions between the first locations by applying a predetermined weather model to the first weather data. The method also includes determining, from the weather map, one or more second locations within the environment where the probability distribution is below a predefined threshold and moving the sensor to the second locations. Further, the method comprises obtaining, by using the sensor, second weather data indicative of a weather condition at each of the second locations for increasing a confidence of the weather map using the second weather data.

According to a third aspect, the present disclosure relates to a computer program comprising instructions, which, when the computer program is executed by a processor cause the processor to carry out the aforementioned method.

According to a fourth aspect, the present disclosure relates to an aerial vehicle. The aerial vehicle comprises at least one sensor and is configured to move to predetermined first locations of an environment and obtain, by using the sensor, first weather data indicative of a weather condition at each of the first locations. Further, the aerial vehicle is configured to provide the first weather data to a data processing circuitry for generating a weather map including a probability distribution of weather conditions between the first locations by applying a predetermined weather model to the first weather data and determining, from the weather map, one or more second locations within the environment where the probability distribution is below a predefined threshold. The aerial vehicle is further configured to move to the second locations and obtain, by using the sensor, second weather data indicative of a weather condition at each of the second locations for increasing a confidence of the weather map using the second weather data.

According to a fifth aspect, the present disclosure relates to a data processing circuitry configured to receive weather data being indicative of a weather condition at first locations of an environment from a mobile device. The data processing circuitry is further configured to generate a weather map including a probability distribution of weather conditions between the first locations of the environment by applying a predetermined weather model to the first weather data. Further, the data processing circuitry is configured to determine, from the weather map, one or more second locations within the environment where the probability distribution is below a predefined threshold for causing the mobile device to move to the second locations and obtain, by using the sensor, second weather data indicative of a weather condition at each of the second locations for increasing a confidence of the weather map using the second weather data.

It should be noted that features mentioned herein in connection with the aforementioned system may be also applied analogously to the above method, aerial vehicle, the computer program and he data processing circuitry and vice versa.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
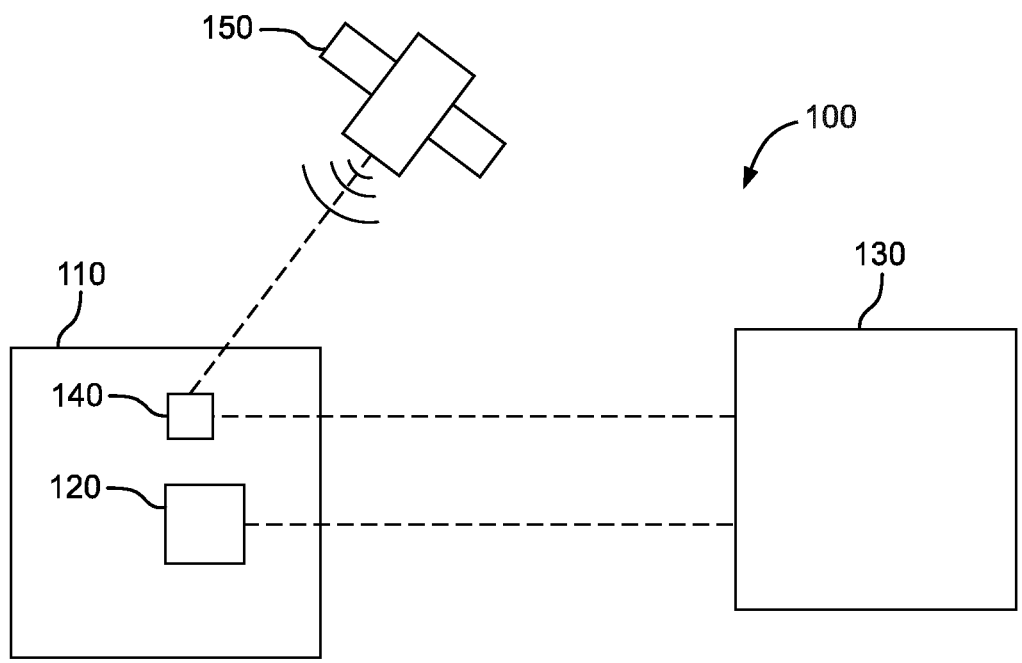
FIG. 1 illustrates a system for generating a weather map.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

A generation of weather maps representing weather conditions within an area or a space may require a number of multiple measurements of the weather conditions at different locations within the area or the space.

The larger the number of measurements, the more time consuming and expensive the generation of the weather map can be.

Hence, there may be a demand of an improved concept for generating a weather map for reducing the number of measurements.

A basic idea of the present disclosure is to sense the weather conditions at predefined first locations, which are distributed over the area or the space, for generating the weather map based on the sensed weather conditions. The weather map includes a probability distribution of weather conditions between the first locations. The probability distribution can be compared with a predefined (probability) threshold to detect second locations of additional measurements where the probability distribution is below a desired level. This allows to have a desired gain of confidence of the weather map by updating the weather map with the additional measurements as input. Moreover, this can avoid redundant measurements at locations where the probability distribution exceeds the desired level of confidence.

FIG. 1 illustrates a system 100 for generating a weather map. The system 100 comprises a mobile device 110 which comprises a sensor 120 for sensing weather conditions.

Such a weather map may contain information on temperature, humidity, air pressure, wind, but also rain or snowfall.

Figure 2A:
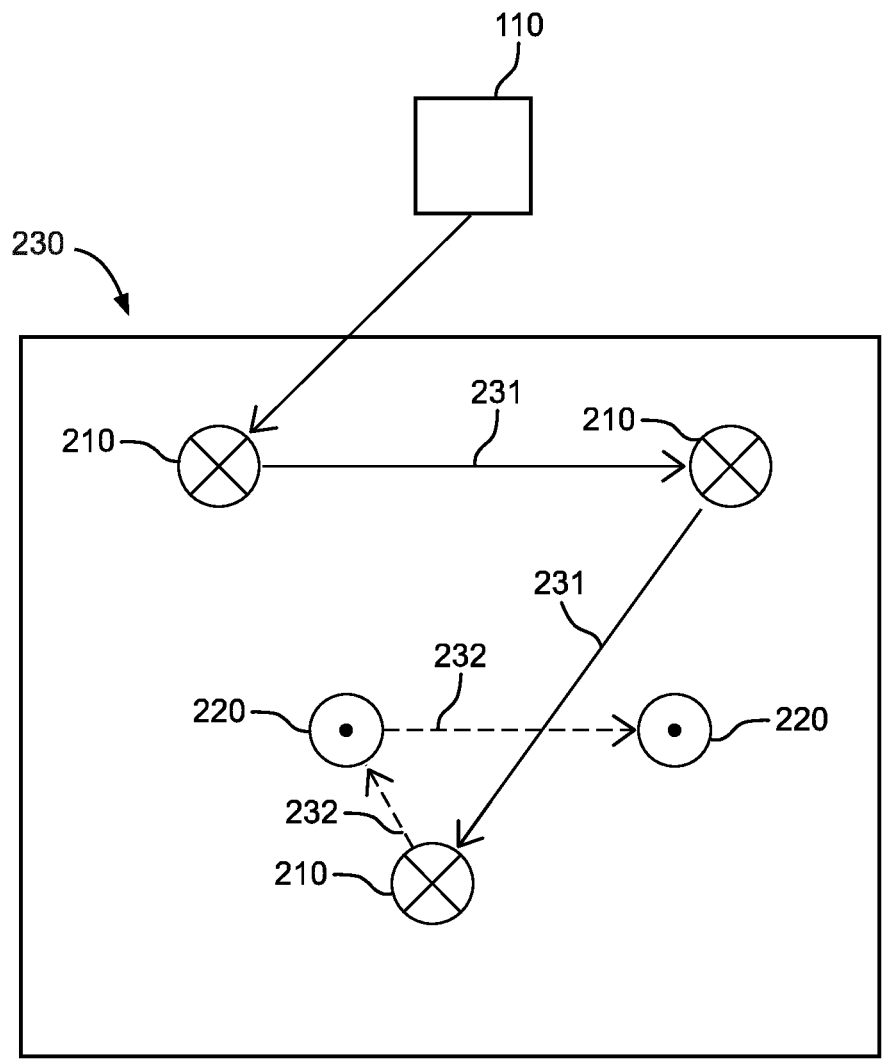
FIG. 2a illustrates a measurement of weather data.

As can be seen in FIG. 2a, the mobile device 110 can move to first locations 210 along first trajectories 231 to obtain first weather data indicative of weather conditions at the first locations 210 of a (predefined) environment 230 by using the sensor 120.

Alternatively, the first weather data can be indicative of a weather condition along the first trajectories 231. For this, the sensor 120 can continuously sense the weather conditions along the first trajectories 231.

For simplification, the environment 230 illustrated in FIG. 2a refers to a two-dimensional area. In practice, the environment 230 can optionally refer to a three-dimensional space, as stated in more detail later.

The sensor 120, for example, is a thermometer, a wind sensor, a humidity sensor or a sensor for sensing fine particles with a diameter of 2.5 µm or less, a so-called "PM2.5 sensor".

Thus, the weather data can be indicative of a temperature, humidity, wind direction, wind velocity, rain, snow, hail, sunshine and/or a concentration of the fine particles which define the sensed weather conditions.

A data processing circuitry 130 of the system 100 can generate a weather map including a probability distribution of weather conditions between the first locations 210 by applying a predetermined weather model to the first weather data.

To this end, the data processing circuitry 130 can input the first weather data into a weather model. The weather model, for example, is a (physical) numerical model, which has been determined through prior weather measurements, for estimating the weather conditions between the first locations 210 from the first weather data based on laws of atmospheric physics and atmospheric chemistry.

In some embodiments of the system 100, the data processing circuitry 130 can be mounted to the mobile device 110 but in the shown example of the system 100, the data processing circuitry 130 is installed separately from the mobile device 110. Hence, the data processing circuitry 130, for example, is not limited by a maximal payload or installation space of the mobile device 110.

The data processing circuitry 130 can further determine, from the weather map, one or more second locations 220 within the environment 230 where the probability distribution is below a predefined threshold which, for example is indicative of a desired minimum probability depending on a predefined minimum level of confidence of the weather map. The threshold may be a fixed value or a dynamic value depending on the probability distribution.

Subsequently, the mobile device 110 can move to the second locations 220 along second trajectories 232 in order to obtain second weather data indicative of weather conditions at each of the second locations 220.

Alternatively, the second weather data can be indicative of a weather condition along the second trajectories 232. To this end, the sensor 120 can continuously sense the weather conditions along the second trajectories 232.

This, for example, enables an update of the weather map using the second weather data, for increasing an overall confidence of the weather map. For the update, the data processing circuitry 130 can apply the weather model to the first weather data and the second weather data.

Further, this may avoid redundant measurements, for example, at locations where the probability distribution is above the minimum probability. Hence, a sum of the first measurements may be lower than, for example, a number of measurements in connection with a generation of a weather map using a (grid-based) raster scan of weather condition within the environment.

The first and the second locations 210 and 220, for example, are indicative of geographical coordinates.

The mobile device 110 comprises a navigation unit 140, which is configured to navigate the mobile device 110 to the first and the second locations 210 and 220.

As can be seen in FIG. 1, the navigation unit 150, for example, communicates with a satellite 150 for geolocation using radio navigation. Thus, the navigation unit 150 can navigate the mobile device 110 based on its geographical position provided by the geolocation.

Further, the data processing circuitry 130 can communicate at least the second locations 220 to the navigation unit 150 wirelessly. In some embodiments, the data processing circuitry 130 further provides the first locations analogously to the mobile device 110. For this, the system 100 can further comprise an interface (not shown) configured to transmit the first and the second weather data wirelessly from the mobile device to the data processing circuitry.

In this way, the data processing circuitry 130 can function as a remote control of the mobile device 110, for example, if the mobile device 110 is an unmanned vehicle.

The data processing circuitry 130 may further calculate a preferred route including the second trajectories 232 of the mobile device 110 for passing the second locations 220. The preferred route can be understood as a preferred route in terms of time or consumption needs of the mobile device 110 to pass the second locations 220. For example, the preferred route represents a beeline or a shortest line connecting the second locations 220. Optionally, the preferred route is calculated in such a way that the mobile device 110 needs a minimal amount of consumption needs to pass the second locations 220. The consumption needs of the mobile device 110 may depend on the weather conditions of the environment 230. For example, the wind orientation and the wind velocity affect the consumption needs of the mobile device 110. Hence, the data processing circuitry 130 may take into account the first weather data for calculating the preferred route.

Analogously, the data processing circuitry 130 can calculate a preferred route of the first trajectories 231 in some embodiments.

Figure 2B:
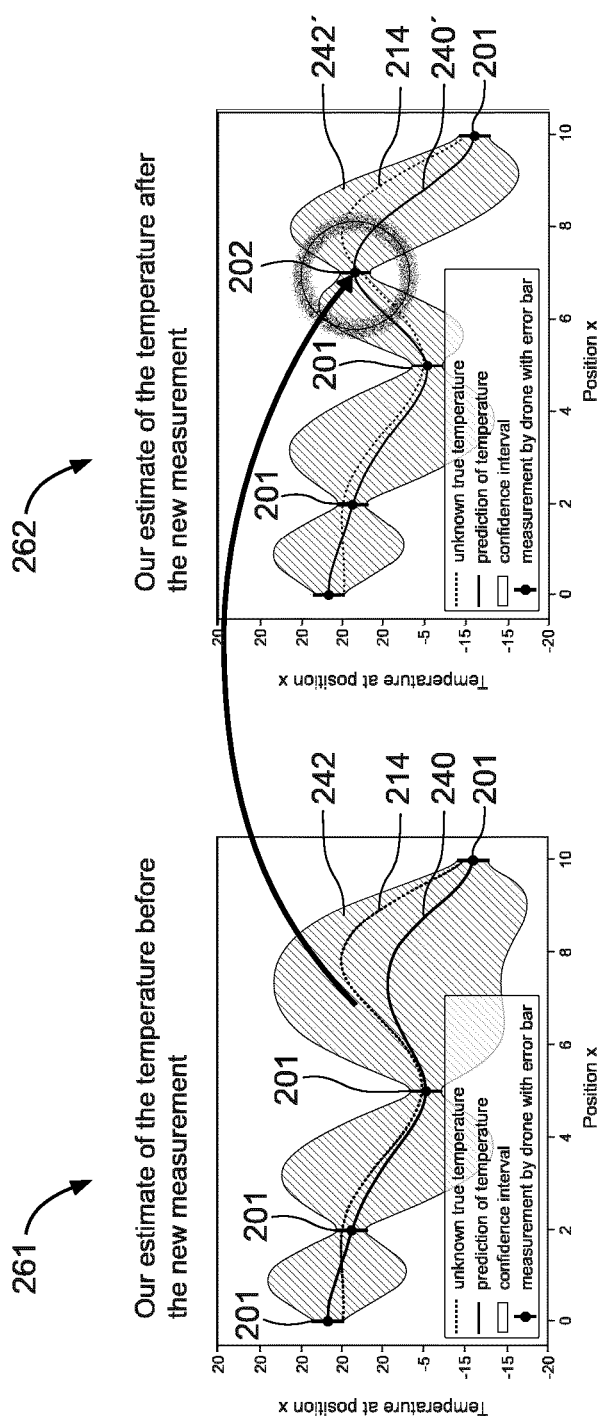
FIG. 2b illustrates a generating and updating of a weather map based on the weather data.

FIG. 2b illustrates a generating and updating of a weather map by reference to a one-dimensional example. In practice, the weather map alternatively can be two- or three dimensional.

A first diagram 261 includes first weather data 201 indicative of a temperature at the first locations 210 and a weather map including an estimated temperature 240 and an estimated error margin 242 indicative of the probability distribution each plotted over a position x.

The estimated error margin 242 can be understood as analog to the above stated probability distribution of the estimated temperature 240 to reflect a true temperature 214.

Hence, a comparison of the estimated error margin 242 with a predefined threshold (not shown) can be understood as equivalent to comparing the probability distribution to a threshold for determining the second locations 220, as stated above.

A second diagram 262 includes an updated weather map based on the first weather data 201 and second weather data 202 indicative of temperature, the updated weather map including an updated estimated temperature 240' and an updated estimated error margin 242' each plotted over the position x.

As can be seen in FIG. 2b, the updated estimated error margin 242' is smaller than the (initial) error margin 242 which indicates a higher confidence of the updated weather map compared to the weather map of the first diagram.

The confidence alternatively can be defined by a so-called "entropy" or uncertainty of the weather map. Analogously, it can be said that the entropy decreases through an update of the weather map by the second weather data 202.

Figure 2C:
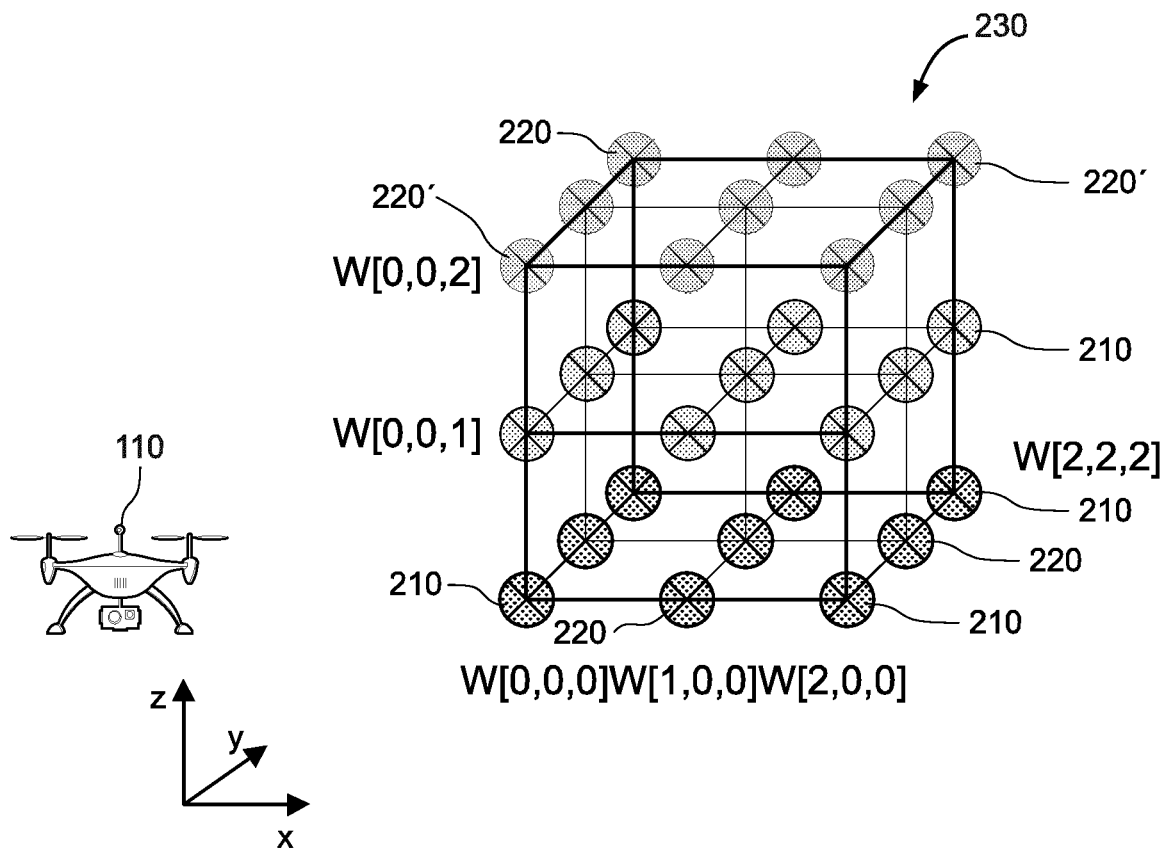
FIG. 2c illustrates a generation of a three-dimensional weather map.

The aforementioned concept can be also applied on three-dimensions, as illustrated in FIG. 2c.

For this the mobile device 110 can be an unmanned aerial vehicle (UAV) which can move to the first and the locations 210 and 220, which in this scenario are distributed in three dimensions within the environment 230.

Accordingly, the weather model can be adapted to a three dimensional scenario.

In a first step, the first weather data w at the predefined first locations 210 X in a three-dimensional space w[i, j, k] may be measured by the UAV 110 together with a timestamp t for determining a (time-dependent) probability distribution P(w|X, t) of a weather map. For this, the weather model may also be time-dependent.

The entropy of the probability distribution P(w|X, t) may be larger than a predefined acceptable level. In other words, a confidence of the probability distribution P(w|X, t) can exceed a predefined threshold at least at one or more second locations 220 within the environment 230 to be observed.

The data processing circuitry 130 subsequently can determine the second locations 220 from the probability distribution P(w|X, t) and optionally for each of the second locations 220 a point in time when the probability distribution P(w|X, t) is below the predefined threshold at the respective second location 220.

Further, the data processing circuitry 130 may determine the preferred route for obtaining the second weather data 202 at the second locations 220. The preferred route may be configured to cause a maximal information gain of the weather map and thus, to increase its confidence. Further, the preferred route can depend on the points of time when the probability distribution falls short of the predefined threshold to anticipate measurements at the second locations 220.

Given the second weather data 220 (and measurement uncertainties) along the second trajectories 232 including the second locations 220, the weather map (the probability distribution P(w|X, t)) can be updated. The updated probability distribution of P(w|X, t) then can be confirmed or if it is not certain enough (i.e., while entropy is above and the confidence below the threshold), the data processing circuitry 130 may determine third locations 220' and may repeat updating the weather map by measurements at the third locations 220' analogously to the update using the second weather data 202. Thus, the weather map can be generated in an iterative way.

This can reduce or ideally minimize a number of required measurements for creating the three-dimensional weather map in accordance with a predefined level of confidence.

For an exemplary illustration: If the UAV 110 senses rainfall (or a very high humidity level), according to the three-dimensional weather model it may be obvious that measurements below would give same measurement results. Hence, the probability distribution of rain at lower locations can be 100%. It is assumed that measurements in lower positions would not reveal extra information and thus may not lead to an increase of confidence of the weather map. Therefore, measurements at lower locations may be neglected.

In some embodiments of the present disclosure, multiple mobile devices/UAVs 110 can be used for obtaining the first and the second weather data 201 and 202.

For example, a first mobile device (not shown) comprising a first sensor can move to a first portion of the predetermined first locations 210 of the environment 230 and obtain a first portion of the first weather data 201 using the first sensor. For the above update of the weather map, the first mobile device can move to a first portion of the second locations 220 of the environment 230 and obtain a first portion of the second weather data 202 using the first sensor.

Analogously, a second mobile device (not shown) comprising a second sensor can move to a second portion of the predetermined first locations 210 of an environment 230 to obtain a second portion of the first weather data 201 using the second sensor and move to a second portion of the second locations of the environment to obtain a second portion of the second weather data 202 using the second sensor.

The first and the second mobile device/UAV, for example, are coordinated to each other to obtain the first and the second weather data 201 and 202 in a collaborative manner. For example, routes of the first and the second mobile device for passing the first and the second locations 210 and 220 can be adapted to each other in order to reduce or ideally minimize a time for obtaining the first and the second portion of the first and the second weather data 201 and 202, respectively. This can be also adapted to embodiments of the present disclosure using more mobile devices/UAVs.

Figure 3A:
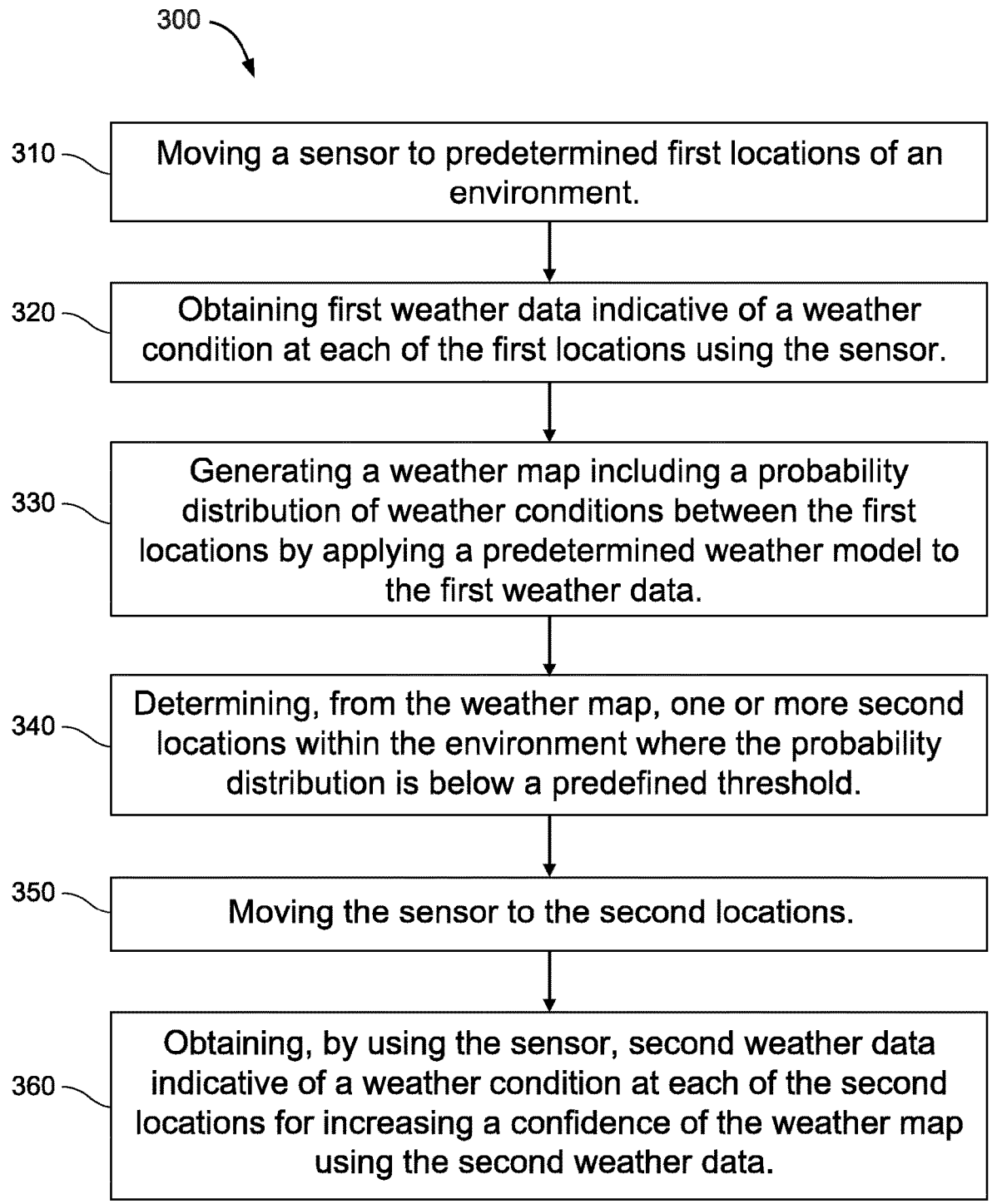
FIG. 3a shows a flow chart schematically illustrating a method for generating a weather map.

FIG. 3a shows a flow chart schematically illustrating a method 300 for generating a weather map. The method comprises moving 310 a sensor to predetermined first locations of an environment and obtaining 320 first weather data indicative of a weather condition at each of the first locations using the sensor.

Further, the method 300 includes generating 330 a weather map including a probability distribution of weather conditions between the first locations by applying a predetermined weather model to the first weather data. The method 300 further provides for determining 340, from the weather map, one or more second locations within the environment where the probability distribution is below a predefined threshold. The method 300 further comprises moving 350 the sensor to the second locations and obtaining 360, by using the sensor, second weather data indicative of a weather condition at each of the second locations for increasing a confidence of the weather map using the second weather data.

Figure 3B:
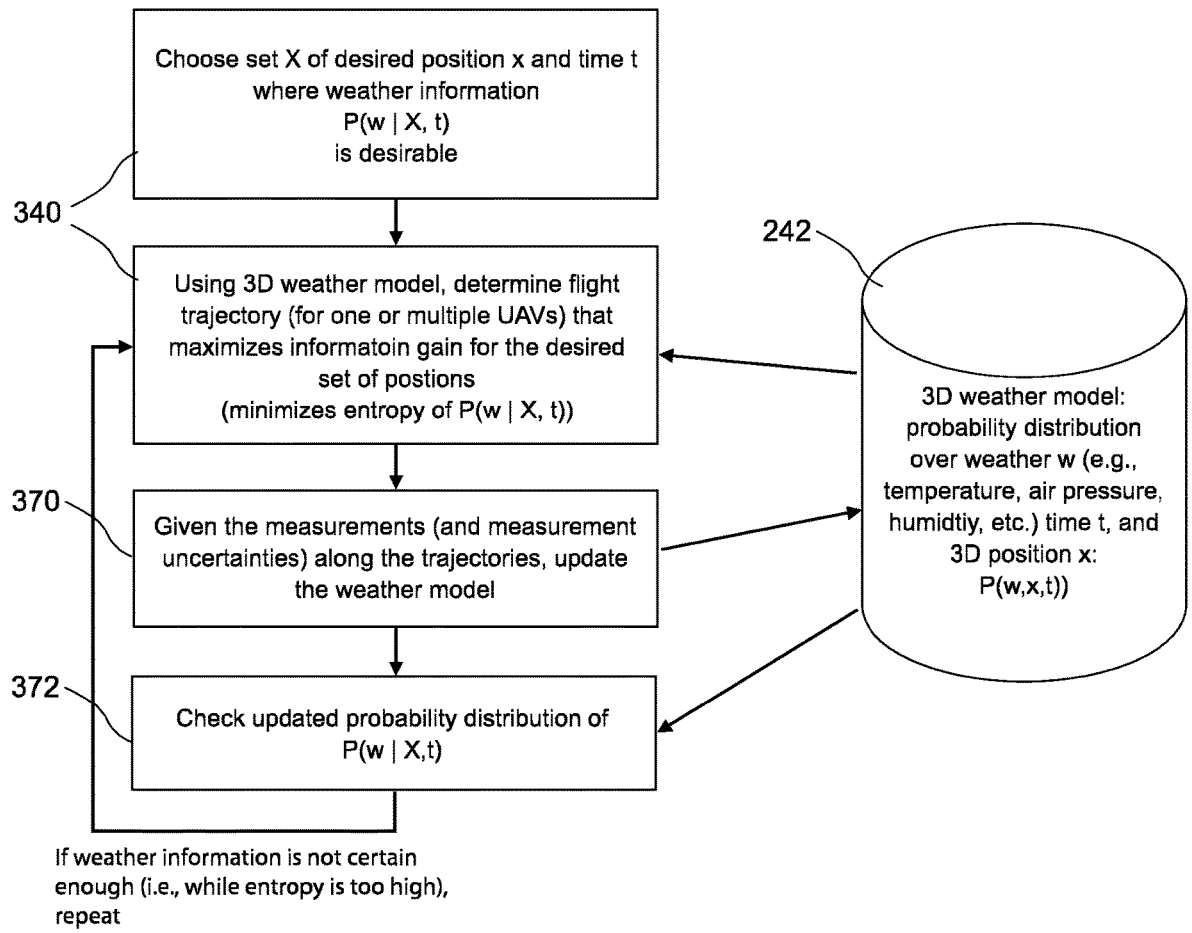
FIG. 3b schematically illustrates an implementation of the method.

FIG. 3b schematically shows an exemplary implementation of the method 300 for iteratively updating the weather map.

In a first step, the data processing circuitry 130, for example, can determine 340 a set of second locations 210 to move the sensor to for obtaining 320 the second weather data 202. For this, the data processing circuitry 130, for example, compares the probability distribution (e.g. the error margin 242) of the weather map with the predefined threshold.

In a second step, the data processing circuitry 130 updates 370 the weather map and thus the probability distribution using the second weather data 202.

In a third step, the data processing circuitry 130 checks 372 whether the updated weather map or its updated probability distribution meets the predefined level of confidence.

The implementation further provides for iteratively updating the weather map according to the first, the second and the third step until the updated map meets the predefined level of confidence.

The following examples pertain to further embodiments:

(1) A system for generating a weather map, comprising:
at least one mobile device comprising at least one sensor, wherein the mobile device is configured to:
move to predetermined first locations within an environment; and
obtain, by using the sensor, first weather data indicative of a weather condition at each of the first locations; and
a data processing circuitry configured to:
generate a weather map including a probability distribution of weather conditions between the first locations by applying a predetermined weather model to the first weather data; and
determine, from the weather map, one or more second locations within the environment where the probability distribution is below a predefined threshold;
wherein the mobile device is further configured to:
move to the second locations; and
obtain, by using the sensor, second weather data indicative of a weather condition at each of the second locations for increasing a confidence of the weather map using the second weather data.

(2) System of (1), wherein the data processing circuitry is configured to apply the weather model to the first weather data and the second weather data for increasing the confidence of the weather map.

(3) System of (1) or (2),
wherein the data processing circuitry is further configured to determine a preferred route including the second locations; and
wherein the mobile device is configured to move to the second locations along the preferred route.

(4) System of any one of (1) to (3), wherein the mobile device is an aerial vehicle.

(5) System of any one of (1) to (4), wherein the data processing circuitry is mounted to the mobile device.

(6) System of any one of (1) to (4), wherein the data processing circuitry is installed separately from the mobile device.

(7) System of any one of (1) to (6),
wherein the mobile device is further configured to obtain, by using the sensor, a time-stamp together with the first weather data at each of the first locations;
wherein the data processing circuitry is configured to:
generate the weather map including a time-dependent probability distribution of weather conditions between the first locations by applying a time-dependent weather model to the first weather data and the time-stamps; and
determine, from the weather map, for each of the second locations a point in time when the probability distribution is below the predefined threshold at the respective second location;
wherein the mobile device is configured to obtain, by using the sensor, the second weather data at each of the second locations at or after the respective point in time for increasing the confidence of the weather map using the second weather data.

(8) System of any one of (1) to (7), comprising:
a first mobile device comprising at least one first sensor, wherein the first mobile device is configured to:
move to a first portion of the predetermined first locations of the environment; and
obtain a first portion of the first weather data using the first sensor;
move to a first portion of the second locations of the environment; and
obtain a first portion of the second weather data using the first sensor; and
a second mobile device comprising a second sensor, wherein the second mobile device is configured to:
move to a second portion of the predetermined first locations of an environment;
obtain a second portion of the first weather data using the second sensor;
move to a second portion of the second locations of the environment; and
obtain a second portion of the second weather data using the second sensor.

(9) System of any one of (1) to (8), further comprising an interface configured to transmit the first and the second weather data wirelessly from the mobile device to the data processing circuitry.

(10) System of any one of (1) to (9),
wherein the first weather data is indicative of a weather condition along one or more first trajectories including the first locations; and
wherein the second weather data is indicative of a weather condition along one or more second trajectories including the second locations.

(11) A method for generating a weather map, comprising:
moving a sensor to predetermined first locations of an environment;
obtaining first weather data indicative of a weather condition at each of the first locations using the sensor;
generating a weather map including a probability distribution of weather conditions between the first locations by applying a predetermined weather model to the first weather data;

determining, from the weather map, one or more second locations within the environment where the probability distribution is below a predefined threshold;

moving the sensor to the second locations; and obtaining, by using the sensor, second weather data indicative of a weather condition at each of the second locations for increasing a confidence of the weather map using the second weather data.

(12) A computer program comprising instructions, which, when the computer program is executed by a processor cause the processor to carry out the method of (11).

(13) An aerial vehicle, comprising:

at least one sensor;

wherein the aerial vehicle is configured to:

move to predetermined first locations of an environment;

obtain, by using the sensor, first weather data indicative of a weather condition at each of the first locations;

provide the first weather data to a data processing circuitry for generating a weather map including a probability distribution of weather conditions between the first locations by applying a predetermined weather model to the first weather data and determining, from the weather map, one or more second locations within the environment where the probability distribution is below a predefined threshold;

move to the second locations; and obtain, by using the sensor, second weather data indicative of a weather condition at each of the second locations for increasing a confidence of the weather map using the second weather data.

(14) A data processing circuitry configured to:

receive first weather data being indicative of a weather condition at first locations of an environment from a mobile device;

generate a weather map including a probability distribution of weather conditions between the first locations of the environment by applying a predetermined weather model to the first weather data; and determine, from the weather map, one or more second locations within the environment where the probability distribution is below a predefined threshold for causing the mobile device to move to the second locations and obtain, by using the sensor, second weather data indicative of a weather condition at each of the second locations for increasing a confidence of the weather map using the second weather data.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A system for generating a weather map, comprising:
at least one mobile device comprising at least one sensor, wherein the mobile device is configured to:
move to predetermined first locations within an environment; and
obtain, by using the sensor, first weather data indicative of a weather condition at each of the first locations; and
a data processing circuitry configured to:
generate a weather map including a probability distribution of weather conditions between the first locations by applying a predetermined weather model to the first weather data; and
determine, from the weather map, one or more second locations within the environment where the probability distribution is below a predefined threshold;
wherein the mobile device is further configured to:
move to the second locations; and
obtain, by using the sensor, second weather data indicative of a weather condition at each of the second locations for increasing a confidence of the weather map using the second weather data.

2. The system of claim 1, wherein
the data processing circuitry is configured to apply the weather model to the first weather data and the second weather data for increasing the confidence of the weather map.

3. The system of claim 1, wherein
the data processing circuitry is further configured to determine a preferred route including the second locations; and
the mobile device is configured to move to the second locations along the preferred route.

4. The system of claim 1, wherein
the mobile device is an aerial vehicle.

5. The system of claim 1, wherein
the data processing circuitry is mounted to the mobile device.

6. The system of claim 1, wherein
the data processing circuitry is separate from the mobile device.

7. The system of claim 1, wherein
the mobile device is further configured to obtain, by using the sensor, a time-stamp together with the first weather data at each of the first locations;
the data processing circuitry is configured to:
generate the weather map including a time-dependent probability distribution of weather conditions between the first locations by applying a time-dependent weather model to the first weather data and the time-stamps; and
determine, from the weather map, for each of the second locations a point in time when the probability distribution is below the predefined threshold at the respective second location; and
wherein the mobile device is configured to obtain, by using the sensor, the second weather data at each of the second locations at or after the respective point in time for increasing the confidence of the weather map using the second weather data.

8. The system of claim 1, comprising:
a first mobile device comprising at least one first sensor, wherein the first mobile device is configured to:
move to a first portion of the predetermined first locations of the environment;
obtain a first portion of the first weather data using the first sensor;
move to a first portion of the second locations of the environment; and
obtain a first portion of the second weather data using the first sensor; and
a second mobile device comprising a second sensor, wherein the second mobile device is configured to:
move to a second portion of the predetermined first locations of an environment;
obtain a second portion of the first weather data using the second sensor;
move to a second portion of the second locations of the environment; and
obtain a second portion of the second weather data using the second sensor.

9. The system of claim 1, further comprising:
an interface configured to transmit the first and the second weather data wirelessly from the mobile device to the data processing circuitry.

10. The system of claim 1, wherein
the first weather data is indicative of a weather condition along one or more first trajectories including the first locations; and
the second weather data is indicative of a weather condition along one or more second trajectories including the second locations.

11. A method for generating a weather map, comprising:
moving a sensor to predetermined first locations of an environment;
obtaining first weather data indicative of a weather condition at each of the first locations using the sensor;
generating a weather map including a probability distribution of weather conditions between the first locations by applying a predetermined weather model to the first weather data;
determining, from the weather map, one or more second locations within the environment where the probability distribution is below a predefined threshold;
moving the sensor to the second locations; and
obtaining, by using the sensor, second weather data indicative of a weather condition at each of the second locations for increasing a confidence of the weather map using the second weather data.

12. A non-transitory computer-readable medium including a computer program comprising instructions, which, when executed by circuitry, cause the processor to carry out the method of claim 11.

13. An aerial vehicle, comprising:
at least one sensor;
wherein the aerial vehicle is configured to:
move to predetermined first locations of an environment;

obtain, by using the sensor, first weather data indicative of a weather condition at each of the first locations;
provide the first weather data to a data processing circuitry for generating a weather map including a probability distribution of weather conditions between the first locations by applying a predetermined weather model to the first weather data and determining, from the weather map, one or more second locations within the environment where the probability distribution is below a predefined threshold;
move to the second locations; and
obtain, by using the sensor, second weather data indicative of a weather condition at each of the second locations for increasing a confidence of the weather map using the second weather data.

14. Processing circuitry configured to:
receive first weather data being indicative of a weather condition at first locations of an environment from a mobile device;
generate a weather map including a probability distribution of weather conditions between the first locations of the environment by applying a predetermined weather model to the first weather data; and
determine, from the weather map, one or more second locations within the environment where the probability distribution is below a predefined threshold for causing the mobile device to move to the second locations and obtain, by using the sensor, second weather data indicative of a weather condition at each of the second locations for increasing a confidence of the weather map using the second weather data.

15. The processing circuitry of claim 14, configured to:
determine a preferred route including the second locations; and
control the mobile device to move to the second locations along the preferred route.

16. The processing circuitry of claim 14, configured to:
receive, from the mobile device, a time-stamp together with the first weather data at each of the first locations;
generate the weather map including a time-dependent probability distribution of weather conditions between the first locations by applying a time-dependent weather model to the first weather data and the time-stamps; and
determine, from the weather map, for each of the second locations a point in time when the probability distribution is below the predefined threshold at the respective second location.

17. The processing circuitry of claim 14, wherein
the first weather data is indicative of a weather condition along one or more first trajectories including the first locations; and
the second weather data is indicative of a weather condition along one or more second trajectories including the second locations.

18. The aerial vehicle of claim 13, wherein the aerial vehicle is configured to:
obtain, by using the sensor, a time-stamp together with the first weather data at each of the first locations; and
provide, to the data processing circuitry, the time-stamp together with the first weather data at each of the first locations.

19. The aerial vehicle of claim 13, wherein
the aerial vehicle is configured to obtain, by using the at least one sensor, the second weather data at each of the second locations after a confidence of the weather map is increased using the second weather data.

20. The aerial vehicle of claim 13, wherein
the first weather data is indicative of a weather condition along one or more first trajectories including the first locations; and
the second weather data is indicative of a weather condition along one or more second trajectories including the second locations.

* * * * *